US012567714B2

(12) United States Patent
Jiang

(10) Patent No.: US 12,567,714 B2
(45) Date of Patent: Mar. 3, 2026

(54) OPTICAL AMPLIFIER AND GAIN ADJUSTMENT METHOD FOR OPTICAL AMPLIFIER

(71) Applicant: HUAWEI TECHNOLOGIES CO., LTD., Shenzhen (CN)

(72) Inventor: Hengyun Jiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1017 days.

(21) Appl. No.: 17/573,132

(22) Filed: Jan. 11, 2022

(65) Prior Publication Data
US 2022/0131330 A1 Apr. 28, 2022

Related U.S. Application Data

(63) Continuation of application No. PCT/CN2020/111887, filed on Aug. 27, 2020.

(30) Foreign Application Priority Data

Sep. 27, 2019 (CN) .......................... 201910926467.1

(51) Int. Cl.
*H01S 3/00* (2006.01)
*H01S 3/067* (2006.01)
(Continued)

(52) U.S. Cl.
CPC ........ *H01S 3/06716* (2013.01); *H01S 3/1001* (2019.08); *H01S 3/10015* (2013.01); (Continued)

(58) Field of Classification Search
CPC .............. H01S 3/06716; H01S 3/1001; H01S 3/10015; H01S 3/10023; H01S 3/1608; H01S 3/302; H01S 2301/04
See application file for complete search history.

(56) References Cited

U.S. PATENT DOCUMENTS 6,621,621 B1 * 9/2003 Jones .................. H04J 14/0212
359/341.41
6,785,042 B1 8/2004 Onaka et al.
(Continued)

FOREIGN PATENT DOCUMENTS

CN 102843192 A 12/2012
CN 103904550 A * 12/2012 ............... H01S 3/30
(Continued)

OTHER PUBLICATIONS

Gong Jiamin et al, Design of Hybrid Optical Fiber Amplifier Based on EDFA and Cascading RFA, Semiconductor Optoelectronics, Oct. 2007, vol. 28, Issue 5, 5 pages.
(Continued)

*Primary Examiner* — Mark Hellner
(74) *Attorney, Agent, or Firm* — Rimon PC

(57) ABSTRACT

This application discloses an optical amplifier including a Raman fiber amplifier (RFA), a dynamic gain equalizer (DGE), a filter, an erbium-doped fiber amplifier (EDFA), an RFA gain controller, an EDFA gain controller, and an optical amplifier controller. The optical amplifier controller is configured to provide instructions to and receive feedback from the RFA and EDFA gain controllers. The RFA and the EDFA are configured to amplify an optical signal. The RFA gain controller is configured to control the RFA to adjust a gain. The EDFA gain controller is configured to control the EDFA to adjust a gain. The DGE adjusts insertion loss. The filter is configured to filter an amplified spontaneous emission signal produced in an optical amplification process of the RFA.

13 Claims, 10 Drawing Sheets

Hybrid optical amplifier 100

(51) Int. Cl.
    *H01S 3/10*           (2006.01)
    *H01S 3/16*           (2006.01)
    *H01S 3/30*           (2006.01)

(52) U.S. Cl.
    CPC ........ *H01S 3/10023* (2013.01); *H01S 3/1608*
          (2013.01); *H01S 3/302* (2013.01); *H01S*
                         *2301/04* (2013.01)

(56)                   References Cited

U.S. PATENT DOCUMENTS

| 2008/0007819 A1 | 1/2008 | Zhou et al. | |
| 2009/0091819 A1 * | 4/2009 | Bolshtyansky | ....... H01S 3/1301 |
| | | | 359/341.5 |
| 2019/0131758 A1 * | 5/2019 | Tao | .................... H04B 10/2916 |

FOREIGN PATENT DOCUMENTS

| CN | 105871468 A | 8/2016 | |
| CN | 103904550 B | 4/2017 | |
| EP | 1703602 A2 * | 9/2006 | ......... H01S 3/10015 |

OTHER PUBLICATIONS

Simranjit Singh et al, Flat-Gain L-Band Raman-EDFA Hybrid Optical Amplifier for Dense Wavelength Division Multiplexed System, IEEE Photonics Technology Letters ( vol. 25, Issue: 3, Feb. 1, 2013), 3 pages.

\* cited by examiner

Hybrid optical amplifier 100

Hybrid optical amplifier 200

Optical amplifier controller 600

Gain controller 700

OPTICAL AMPLIFIER AND GAIN ADJUSTMENT METHOD FOR OPTICAL AMPLIFIER

CROSS-REFERENCE TO RELATED APPLICATIONS

This application is a continuation of International Application No. PCT/CN2020/111887, filed on Aug. 27, 2020, which claims priority to Chinese Patent Application No. 201910926467.1, filed on Sep. 27, 2019. The disclosures of the aforementioned applications are hereby incorporated by reference in their entireties.

TECHNICAL FIELD

This application relates to the field of optical communications, and in particular, to an optical amplifier and a gain adjustment method for an optical amplifier.

BACKGROUND

Power equalization is an important technology in Wavelength Division Multiplexing (WDM) systems. After a WDM signal with an unequalized gain passes through an Optical Amplifier (OA), the unequalized gain may be amplified. For example, in a long-haul transmission system that includes a plurality of cascaded Erbium-Doped Fiber Amplifiers (EDFAs), the power of a signal with a specific wavelength may decrease or become so weak that it cannot be detected, resulting in a decrease in the signal-to-noise ratio and an increase in the bit error rate. Unequalized signal power is mainly caused by the uneven gain spectrum of an optical amplifier, that is, unequalized gains for signals with different wavelengths. Therefore, power equalization of a WDM system can be achieved by imposing gain flattening on an optical amplifier.

A gain flattening filter is a band-stop optical filter used in an optical amplifier to flatten a gain spectrum. Currently, gain flattening filters mainly include two types: a fixed Gain flattening filter (GFF), and a Dynamic Gain Flattening Filter (DGFF) or a Dynamic Gain Equalizer (DGE).

The fixed gain flattening filter features, for example, simple structure and low loss, and has been widely used in commercial optical amplifiers. However, because the ripple (a gain difference between maximum and minimum gains in a range of operating wavelengths) of a gain spectrum of a currently widely used Raman Fiber Amplifier (RFA) varies with the gain, the fixed gain flattening filter cannot achieve gain spectrum flattening at different gains. Currently, two stages of EDFAs connected to a fixed gain flattening filter and a Variable Optical Attenuator (VOA) are used to achieve gain spectrum flattening for a Raman fiber amplifier. However, the addition of the VOA accelerates Noise Figure (NF) degradation of a hybrid optical amplifier at a lower gain. A DGFF/DGE is mainly implemented using technologies such as 1×1 Wavelength Selective Switching (WSS), a cascaded Fiber Bragg Grating (FBG), and a lattice filter, and a filter transfer function may be dynamically tunable using mechanical means, thermo-optic and electro-optic effects, and the like. Currently, a new optical amplifier using a DGFF/DGE is urgently needed to improve gain flatness and noise performance of the optical amplifier.

SUMMARY

In view of the problems described in the Background section, embodiments of this application provide an improved optical amplifier and a gain adjustment method for use in an optical amplifier to improve gain flatness and noise performance of the optical amplifier.

According to a first aspect, an embodiment of this application provides a hybrid optical amplifier, where the hybrid optical amplifier includes: a first amplifier, a second amplifier, a DGE, and a control center; the first amplifier, the DGE, and the second amplifier are sequentially connected; and the control center includes a first controller and a second controller. The first controller includes a first input terminal, a second input terminal, and a first output terminal, where the first input terminal is configured to receive input optical signal information of the first amplifier, the second input terminal is configured to receive output optical signal information of the first amplifier, the first output terminal is configured to output a first amplification control signal to the first amplifier, and the first amplifier performs gain adjustment based on the first amplification control signal. A principle of adjustment by the second controller is similar to that of adjustment by the first controller, and a second output terminal of the second controller outputs a second amplification control signal to the second amplifier. The control center obtains an adjustment control signal by means of calculation based on inputs and outputs of the first controller and the second controller, and outputs the adjustment control signal to the DGE through a third output terminal. The DGE adjusts an insertion loss curve of the DGE based on the adjustment control signal.

According to a second aspect, an embodiment of this application provides a hybrid optical amplifier, including a Raman fiber amplifier RFA, a dynamic gain equalizer DGE, a filter, a first erbium-doped fiber amplifier EDFA, an RFA gain controller, a first EDFA gain controller, and an optical amplifier controller, where the RFA gain controller is connected to the RFA, the RFA gain controller is further connected to the filter, and the filter is connected to an output terminal of the RFA; the EDFA gain controller is connected to the first EDFA; the optical amplifier controller is connected to the RFA gain controller, and the optical amplifier controller is further connected to the first EDFA gain controller; and the RFA is connected to the DGE, and the DGE is further connected to the first EDFA;

the optical amplifier controller is configured to send a first instruction to the RFA gain controller, send a second instruction to the first EDFA gain controller, and send a DGE control instruction to the DGE; the RFA and the first EDFA are configured to amplify an optical signal, and the RFA gain controller is configured to control the RFA to adjust a gain according to the first instruction; the first EDFA gain controller is configured to control the first EDFA to adjust a gain according to the second instruction; and the DGE adjusts an insertion loss according to the DGE control instruction; and the filter is configured to filter an amplified spontaneous emission (ASE) signal produced in an optical amplification process of the RFA.

In a possible design, the optical amplifier controller determines an on-off gain of the RFA based on the ASE signal, where the on-off gain is a ratio of the output signal power with a pump of the RFA being on to the output signal power with the pump being off.

In a possible design, the controlling, by the RFA gain controller, the RFA to adjust a gain according to the first instruction sent by the optical amplifier controller includes: receiving, by the RFA gain controller, the first instruction sent by the optical amplifier controller; and sending, by the RFA gain controller, a first pump control signal to the RFA according to the first instruction, so that the RFA adjusts a pump current based on the first pump control signal.

In a possible design, the controlling, by the first EDFA gain controller, the first EDFA to adjust a gain according to the second instruction sent by the optical amplifier controller includes: receiving, by the first EDFA gain controller, the second instruction sent by the optical amplifier controller; and sending, by the first EDFA gain controller, a second pump control signal to the first EDFA according to the second instruction, so that the first EDFA adjusts a pump current based on the second pump control signal.

In a possible design, the optical amplifier further includes a second EDFA and a second EDFA gain controller, where the second EDFA is connected between the RFA and the DGE, or the second EDFA is connected between the DGE and the first EDFA; and the second EDFA is connected to the second EDFA gain controller, and the second EDFA gain controller controls the second EDFA to adjust a gain, according to a fourth instruction sent by the optical amplifier controller.

In a possible design, the controlling, by the second EDFA gain controller, the second EDFA to adjust a gain, according to the fourth instruction sent by the optical amplifier controller includes: receiving, by the second EDFA gain controller, the fourth instruction sent by the optical amplifier controller; and sending, by the second EDFA gain controller, a third pump control signal to the second EDFA according to the fourth instruction, so that the second EDFA adjusts a pump current based on the third pump control signal.

In a possible design, the optical amplifier further includes a gain flattening filter GFF, and the GFF is configured to narrow an adjustment range of the insertion loss of the DGE.

In a possible design, the RFA gain controller is further configured to send a first feedback message to the optical amplifier controller, and the first feedback message includes an actual gain value of the RFA; the first EDFA gain controller is further configured to send a second feedback message to the optical amplifier controller, and the second feedback message includes an actual gain value of the first EDFA.

In a possible design, the optical amplifier controller obtains an insertion loss value of the DGE based on the actual gain value of the RFA and the actual gain value of the first EDFA, and the insertion loss value of the DGE is a value obtained by subtracting a target gain value of the hybrid optical amplifier from a sum of the actual gain value of the RFA and the actual gain value of the first EDFA.

The DGE-based hybrid optical amplifier provided in this embodiment of this application resolves the problem of an uneven gain in a dynamic gain adjustment process of a cascade of two types of optical amplifiers (e.g., a Raman fiber amplifier and an erbium-doped fiber amplifier), therefore significantly improves the noise performance of the amplifier, and reduces additional loss caused by the use of a GFF and a VOA in an existing technical solution.

According to a third aspect, an embodiment of this application provides a gain adjustment method for a hybrid optical amplifier, where the method is applied to any hybrid optical amplifier according to the second aspect, and the method includes:

determining a target gain value of the hybrid optical amplifier;

adjusting an actual gain value of an RFA and/or an EDFA, and when a sum of the actual gain value of the RFA and the actual gain value of the EDFA is greater than the target gain value of the hybrid optical amplifier, determining an actual insertion loss value of a DGE; and sending a DGE control instruction to the DGE to control the insertion loss of the DGE, so that the insertion loss of the DGE reaches the determined actual insertion loss value of the DGE.

In a possible design, the actual insertion loss value of the DGE is a value obtained by subtracting the target gain value of the hybrid optical amplifier from a sum of the actual gain value of the RFA and the actual gain value of the EDFA.

In a possible design, the adjusting an actual gain value of an RFA and/or an EDFA includes:

sending, by an optical amplifier controller, a first instruction to the RFA gain controller and/or sending a second instruction to the EDFA gain controller; generating, according to the first instruction, a first pump control signal to adjust the actual gain value of the RFA; and generating, according to the second instruction, a second pump control signal to adjust the actual gain value of the EDFA.

According to a fourth aspect, an embodiment of this application further provides an optical amplifier controller, applied to any hybrid optical amplifier according to the second aspect, and the optical amplifier controller includes: a sending module, a receiving module, and a calculation module. Here the term "module" may refer to a functional component, a processing circuit programmed to perform certain functions, a device, a hardware or software unit. In the optical amplifier controller, the sending module is configured to send a control instruction to adjust a pump current of an RFA or an EDFA;

the receiving module is configured to receive a first feedback message and a second feedback message, where the first feedback message includes an actual gain value of the RFA, and the second feedback message includes an actual gain value of the EDFA;

the calculation module is configured to determine an actual insertion loss value of a DGE based on the actual gain value of the RFA and the actual gain value of the EDFA; and the sending module is further configured to send a DGE control instruction, so that insertion loss of the DGE reaches the determined actual insertion loss value of the DGE.

In a possible design, the determining, by the calculation module, an actual insertion loss value of a DGE based on the actual gain value of the RFA and the actual gain value of the EDFA may include:

determining, by the calculation module, whether a sum of the actual gain value of the RFA and the actual gain value of the EDFA is greater than a target gain value of the optical amplifier: when the calculation module determines that the sum of the actual gain value of the RFA and the actual gain value of the EDFA is greater than the target gain value of the hybrid optical amplifier, the actual insertion loss value of the DGE is a value obtained by subtracting the target gain value of the hybrid optical amplifier from the sum of the actual gain value of the RFA and the actual gain value of the EDFA.

In a possible design, the sending, by the sending module, a control instruction to adjust a pump current of an RFA or an EDFA may include:

sending, by the sending module, a first instruction to an RFA gain controller, and/or sending a second instruction to an EDFA gain controller, where the first instruction is used to generate a first pump control signal to adjust the actual gain value of the RFA; and the second instruction is used to generate a second pump control signal to adjust the actual gain value of the EDFA.

According to a fifth aspect, an embodiment of this application provides a gain controller, applied to any hybrid optical amplifier according to the second aspect, and the gain controller includes: a receiving module, a calculation module, and a sending module, where the receiving module is configured to receive a control instruction;

the calculation module is configured to generate a pump control signal according to the control instruction, where the pump control signal is used to adjust a pump current of an RFA and/or an EDFA; and the sending module is configured to send the pump control signal.

In a possible design, the sending module is further configured to send a first feedback message to an optical amplifier controller, or send a second feedback message to the optical amplifier controller, where the first feedback message includes an actual gain value of the RFA, and the second feedback message includes an actual gain value of the EDFA.

According to a sixth aspect, an embodiment of this application further provides an optical amplifier controller, applied to any hybrid optical amplifier according to the second aspect, and the optical amplifier controller includes: an input interface, a circuit or processing circuit, and an output interface, where the output interface is configured to output a control instruction to adjust a pump current of an RFA or an EDFA;

the input interface is configured to obtain a first feedback message and a second feedback message, where the first feedback message includes an actual gain value of the RFA, and the second feedback message includes an actual gain value of the EDFA;

the processing circuit is configured to determine an actual insertion loss value of a DGE based on the actual gain value of the RFA and the actual gain value of the EDFA; and the output interface is further configured to output a DGE control instruction, so that insertion loss of the DGE reaches the determined actual insertion loss value of the DGE.

In a possible design, the determining, by the circuit, an actual insertion loss value of the DGE based on the actual gain value of the RFA and actual gain value of the EDFA may include:

determining, by the circuit, whether a sum of the actual gain value of the RFA and the actual gain value of the EDFA is greater than a target gain value of the optical amplifier: when the circuit determines that the sum of the actual gain value of the RFA and the actual gain value of the EDFA is greater than the target gain value of the hybrid optical amplifier, the actual insertion loss value of the DGE is a value obtained by subtracting the target gain value of the hybrid optical amplifier from the sum of the actual gain value of the RFA and the actual gain value of the EDFA.

In a possible design, the sending, by the output interface, a control instruction to adjust a pump current of an RFA or an EDFA may include:

sending, by the output interface, a first instruction to an RFA gain controller, and/or sending a second instruction to an EDFA gain controller, where the first instruction is used to generate a first pump control signal to adjust the actual gain value of the RFA; and the second instruction is used to generate a second pump control signal to adjust the actual gain value of the EDFA.

According to a seventh aspect, an embodiment of this application further provides a gain controller, applied to any hybrid optical amplifier according to the second aspect, and the gain controller includes: an input interface, a circuit, and an output interface, where the input interface is configured to obtain a control instruction;

the circuit is configured to generate a pump control signal according to the control instruction, where the pump control signal is used to adjust a pump current of an RFA and/or an EDFA; and the output interface is configured to output the pump control signal.

In a possible design, the output interface is further configured to output a first feedback message to an optical amplifier controller, or output a second feedback message to the optical amplifier controller, where the first feedback message includes an actual gain value of the RFA, and the second feedback message includes an actual gain value of the EDFA.

According to an eighth aspect, an embodiment of this application provides a chip, including a memory and a processor. The memory is configured to store a computer program. The processor is configured to invoke the computer program from the memory and run the computer program, to perform the method performed in the third aspect, or the method performed by the optical amplifier controller in the fourth aspect to the seventh aspect, or the method performed by the gain controller in the fourth aspect to the seventh aspect.

In a possible design, the chip includes the processor. The processor is configured to read and execute the computer program stored in the memory. When the computer program is executed, the processor performs the method performed in the third aspect, or the method performed by the optical amplifier controller in the fourth aspect to the seventh aspect, or the method performed by the gain controller in the fourth aspect to the seventh aspect.

In a possible design, the memory and the processor may be separate units, or physically independent, or the memory and the processor may be integrated together.

According to a ninth aspect, an embodiment of this application further provides a system chip. The system chip includes a processing unit and a communications unit. The processing unit may be, for example, a processing circuit. The communications unit may be, for example, an input/output interface, a pin, or a circuit. The processing unit may perform the method performed by the circuit in the sixth aspect or the seventh aspect, and the communications unit performs the method performed by the input interface or the output interface in the sixth aspect or the seventh aspect.

According to a tenth aspect, an embodiment of this application further provides a gain controller. The gain controller includes a photodetector, an analog-to-digital converter, and a chip. The photodetector is configured to detect an input optical power gain of an optical amplifier, convert an optical signal into an electrical signal, and output the electrical signal to the analog-to-digital converter via an interface. The chip is connected to the analog-to-digital converter via the interface to read the input optical power gain. The chip may be the system chip in the ninth aspect, and performs the method performed by the system chip, where the method includes outputting an obtained optical power gain value to an optical amplifier controller via an output interface.

The optical amplifier controller and the gain controller may be physically separate components, or may be integrated together.

This application provides an optical amplifier and an gain adjustment method for an optical amplifier, an optical amplifier controller, an gain controller, and related chip. The DGE-based hybrid optical amplifier disclosed herein resolves the problem of an uneven gain in a dynamic gain adjustment process of a cascade of two types of optical amplifiers, e.g., a Raman fiber amplifier and an erbium-doped fiber amplifier, and significantly improves noise performance of the amplifier.

BRIEF DESCRIPTION OF DRAWINGS

To describe technical solutions as embodiments of this application more clearly, the following briefly describes the accompanying drawings that are referred to in the background and/or the embodiments. The following accompanying drawings describe certain embodiments of this application, and a person of ordinary skill in the art may still derive other accompanying drawings or embodiments from these accompanying drawings and description without creative efforts. This application is intended to cover all derived accompanying drawings or embodiments.

DETAILED DESCRIPTION OF EMBODIMENTS

In an existing solution, a GFF is installed in an optical amplifier. The GFF filters optical power of the optical amplifier at each wavelength according to an insertion loss curve of the GFF, so that the gains corresponding to different wavelengths in the optical amplifier are attenuated to some extent, thereby adjusting the gain curve of the optical amplifier. In this application, a DGFF or a DGE is used to adjust the gain curve of the optical amplifier. A person skilled in the art may understand that DGFF is similar to DGE, and the DGE is used as an example throughout the following description.

Figure 1:
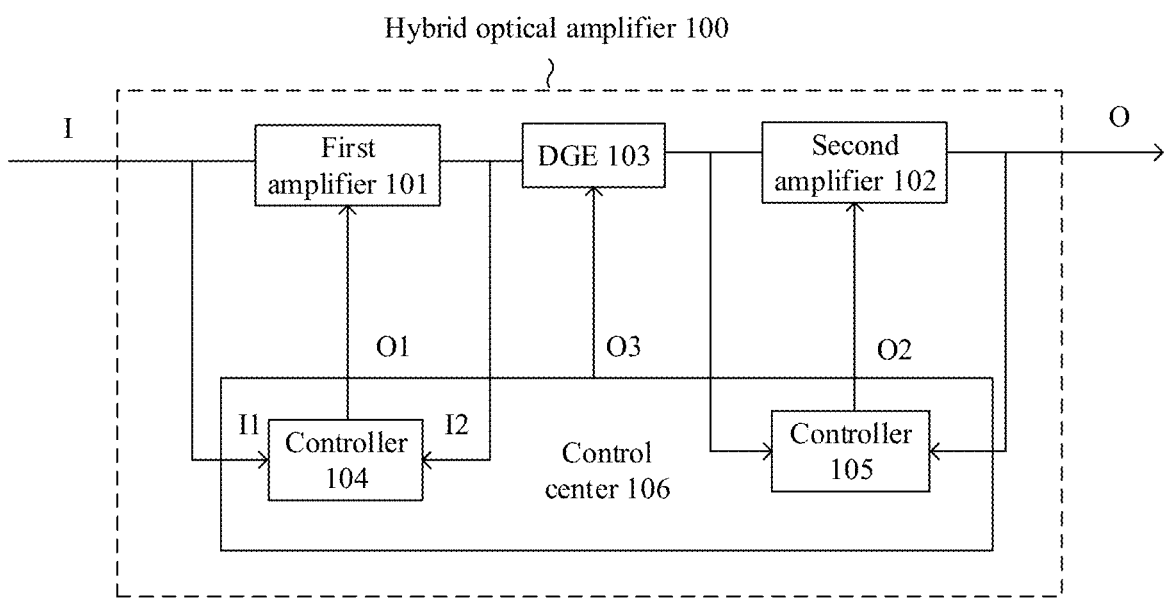
FIG. 1 is a schematic structural diagram of a hybrid optical amplifier 100 according to an embodiment of this application.

FIG. 1 is a schematic structural diagram of a hybrid optical amplifier 100 according to an embodiment of this application. As can be learned from FIG. 1, the optical amplifier 100 includes: a first amplifier 101, a second amplifier 102, a DGE 103, and a control center 106. The first amplifier 101, the DGE 103, and the second amplifier 102 are sequentially connected. The control center 106 includes a controller 104 and a controller 105. The controller 104 includes a first input terminal I1, a second input terminal I2, and a first output terminal O1, where the first input terminal I1 is configured to receive input optical signal information of the first amplifier, the second input terminal I2 is configured to receive output optical signal information of the first amplifier, the first output terminal O1 is configured to output a first amplification control signal to the first amplifier 101, and the first amplifier 101 performs gain adjustment based on the first amplification control signal. An adjustment process of the controller 105 is similar to that of the controller 104, and a second output terminal O2 of the controller 105 outputs a second amplification control signal to the second amplifier 102. The control center 106 obtains an adjustment control signal by means of calculation based on inputs and outputs of the controller 104 and the controller 105, and outputs the adjustment control signal to the DGE 103 through a third output terminal O3. The DGE 103 is configured to adjust an insertion loss curve of the DGE based on the adjustment control signal.

In this embodiment, the first amplifier 101 and the second amplifier 102 respectively serve as a preamplifier and a power amplifier of the hybrid optical amplifier 100, and each may include a pump source and a doped fiber. The pump source is arranged upstream or downstream of the doped fiber along an optical signal transmission direction, and there may be one or more pump sources. The first amplifier 101 and the second amplifier 102 may be of different types, for example, may be a fiber amplifier or a Semiconductor Optical Amplifier (SOA). The fiber amplifier may be an RFA, an EDFA, or another rare-earth-doped optical amplifier.

The controller 104 may obtain the first amplification control signal by means of calculation based on a gain characteristic parameter of the first amplifier 101, an adjustment control characteristic parameter of the DGE 103, target output optical power information of the first amplifier 101, and an input optical signal of the first amplifier 101. The controller 105 may obtain the second amplification control signal by means of calculation based on a gain characteristic parameter of the second amplifier 102, the adjustment control characteristic parameter of the DGE 103, the target output optical power information of the second amplifier 102, and an input optical signal of the second amplifier 102. The control center 106 may obtain the adjustment control signal by means of calculation based on the input optical signal of the first amplifier 101, the input optical signal of the second amplifier 102, the gain characteristic parameter of the first amplifier 101, the gain characteristic parameter of the second amplifier 102, the target output optical power information of the first amplifier 101, the target output optical power information of the second amplifier 102, and the adjustment control characteristic parameter of the DGE 103. The first amplifier 101 and the second amplifier 102 amplify an optical signal based on the first amplification control signal and the second amplification control signal, respectively, and the DGE 103 adjusts a gain curve of the optical amplifier based on the adjustment control signal. Therefore, the first amplifier 101, the DGE 103, and the second amplifier 102 cooperate with one another to adjust the gain curve of the hybrid optical amplifier 100. The gain characteristic parameter of the first amplifier or the second amplifier may be a power amplification multiple of the first amplifier or the second amplifier for each wavelength. The adjustment control characteristic parameter of the DGE may be a relationship parameter between the insertion loss of each wavelength and the adjustment control signal.

In this embodiment, the first amplifier 101 may further perform wavelength-level gain locking based on the first amplification control signal output by the controller 104, where the first amplification control signal includes a function corresponding to a target gain curve G1, and the first amplifier 101 sets the gain curve of the first amplifier as the target gain curve G1. Similarly, the second amplifier 102 may set a gain curve of the second amplifier as a target gain curve G2 based on the second amplification control signal output by the controller 105, where the second amplification control signal includes a function corresponding to the target gain curve G2. The DGE 103 may set the insertion loss curve of the DGE as a target insertion loss curve G3 based on the adjustment control signal output by the control center 106, where the adjustment control signal includes a function corresponding to the target insertion loss curve G3. It may be understood that, to maintain gain flatness of the hybrid optical amplifier, the sum of the values of the target gain curve G1, the target gain curve G2, and the target insertion loss curve G3 at different moments in time should remain unchanged. In other words, G0=G1+G2+G3, and G0 is a horizontal gain curve.

When the hybrid optical amplifier operates at different gains, the gain functions of the first amplifier and the second amplifier, and a filter function of a dynamic gain equalization filter can be preset. In an actual process, due to changes in power of an input signal, the actual gains of the first amplifier and the second amplifier need to be separately controlled to reach the preset gain. To be specific, when the power of the input signal changes but the gain G0 of the amplifier does not change, the gain functions of the first amplifier and the second amplifier do not change. This simple control method can make the calculation process of the function of the DGE less complex, while ensuring the performance of the optical amplifier, thereby improving the running speed of the amplifier.

In this embodiment, a connection sequence of the first amplifier 101, the DGE 103, and the second amplifier 102 is interchangeable. This is not limited in this application.

Figure 2A:
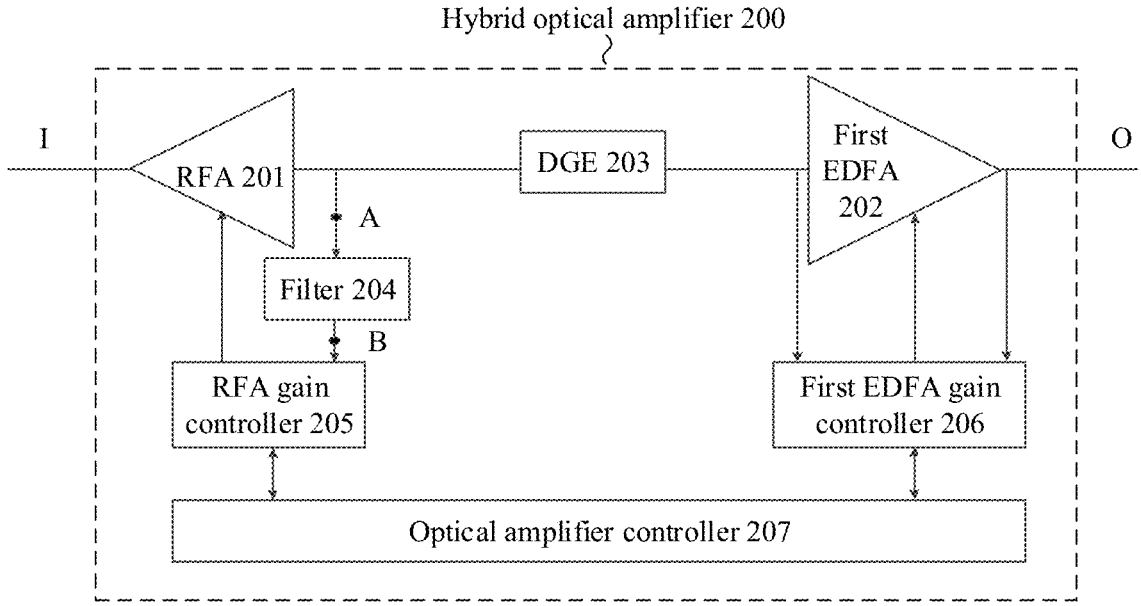
FIG. 2a is a schematic structural diagram of another hybrid optical amplifier 200 according to an embodiment of this application.

FIG. 2a is a schematic structural diagram of another hybrid optical amplifier 200 according to an embodiment of this application. The optical amplifier includes an RFA 201, a first EDFA 202, a DGE 203, a filter 204, an RFA gain controller 205, a first EDFA gain controller 206, and an optical amplifier controller 207. The RFA gain controller 205 is connected to the RFA 201, the RFA gain controller 205 is further connected to the filter 204, and the filter 204 is connected to an output terminal of the RFA 201. The first EDFA gain controller 206 is connected to the first EDFA 202. The optical amplifier controller 207 is connected to the RFA gain controller 205, and the optical amplifier controller 207 is further connected to the first EDFA gain controller 206. The RFA 201 is connected to the DGE 203, and the DGE 203 is further connected to the first EDFA 202.

For the RFA, the DGE, and the EDFA shown in the accompanying drawings in the embodiments of this application, a terminal to the left of the drawings (not shown) is an input terminal, and a terminal to the right of the drawings (not shown) is an output terminal.

The RFA in this embodiment of this application may be a Distributed Raman Amplifier (DRA). Specifically, the RFA may include a transmission fiber-optic link, a pump source, and a polarization multiplexer. The pump source is disposed upstream or downstream of a transmission fiber along an optical signal transmission direction, and there may be one or more pump sources. With development of technologies, the RFA designed in this embodiment of this application may alternatively be any other distributed amplifier, for example, a distributed parametric amplifier.

The RFA gain controller 205 is configured to monitor a gain of the RFA 201 in an actual operating process. The RFA gain controller 205 measures an actual operating gain G1 of the RFA by measuring strength of its input optical signal, and feeds back the actual operating gain G1 to the optical amplifier controller 207 in real time. Further, the RFA gain controller 205 may further generate a first pump control signal according to a first instruction sent by the optical amplifier controller 207, and send the first pump control signal to the RFA 201, where the first pump control signal is used to adjust a pump current in the RFA, to implement a gain adjustment function of the RFA.

Optionally, the RFA gain controller 205 sends a first feedback message to the optical amplifier controller 207, where the first feedback message includes an actual gain value of the RFA 201.

In addition, an output signal of the RFA 201 is filtered by the filter 204 and then input to the RFA gain controller 205. The filter 204 is configured to filter an Amplified Spontaneous Emission (ASE) signal produced in an optical amplification process of the RFA.

Figure 2B:
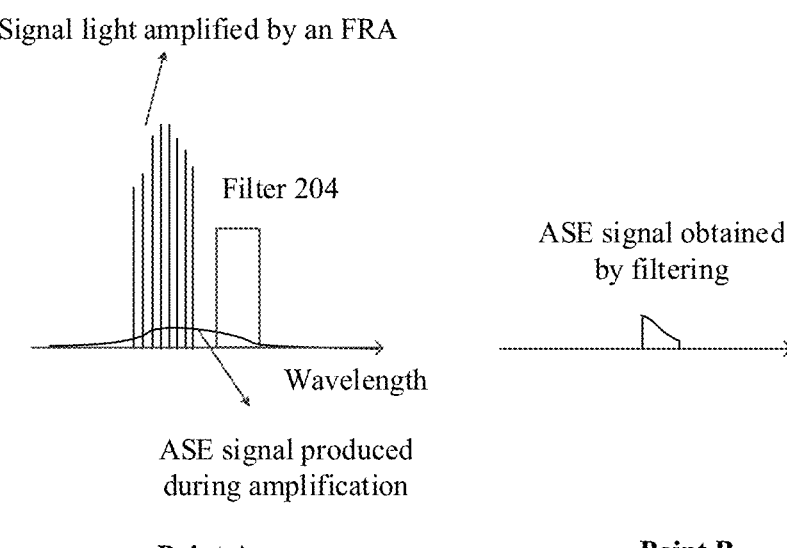
FIG. 2b is a diagram of a working principle of a filter according to an embodiment of this application.

Specifically, the filter 204 is a narrow band-pass optical filter. As shown in FIG. 2a and FIG. 2b, point A is at an input terminal of the filter, and the ASE signal produced due to a spontaneous emission phenomenon in the optical amplification process of the RFA can be detected at point A. The passband range of the filter 204 is outside the wavelength of the signal light, but falls within the wavelength range of the gain spectrum of the RFA. Point B is at an output terminal of the filter, and an ASE signal obtained by the filter by filtering can be detected at point B.

In a possible design, an on-off gain actually produced in the amplification process of the RFA may be calculated based on the intensity of the power of the ASE signal, where the on-off gain is a ratio of the output signal power with a pump of the RFA being turned on to the output signal power with the pump being turned off. Optionally, the power of the ASE signal obtained by filtering is directly proportional to the on-off gain of the RFA, and a specific proportionality coefficient is determined based on a bandwidth and/or a central wavelength of the filter 204.

In a possible design, the power of the ASE may be uniquely determined by the gain of the RFA and the power of the input optical signal (the optical power of the ASE is less related to the input optical power at the same gain), that is, corresponds to a span and gain specification. When the signal gain is locked, the ASE is a fixed value.

The first EDFA gain controller 206 is configured to monitor a gain of the first EDFA 202 in an actual operating process. The first EDFA gain controller 206 detects an actual gain value G2 of the first EDFA 202 based on a difference between an optical signal at an input terminal and an output terminal of the first EDFA 202, and feeds back the actual gain value G2 to the optical amplifier controller 207 in real time. Further, the first EDFA gain controller 206 may generate a second pump control signal according to a second instruction sent by the optical amplifier controller 207, and send the second pump control signal to the first EDFA 202, where the second pump control signal is used to control a pump in the first EDFA 202, to implement a gain adjustment function of the first EDFA.

Optionally, the first EDFA gain controller 206 sends a second feedback message to the optical amplifier controller 207, where the second feedback message includes the actual gain value G2 of the first EDFA 202.

After the optical amplifier controller 207 receives the actual gain value G1 of the RFA 201 that is fed back by the RFA gain controller 205 and the actual gain value G2 of the first EDFA 202 that is fed back by the first EDFA gain controller 206, an actual insertion loss value G3 of the DGE 203 is obtained by means of calculation based on a target amplification gain G0 of the hybrid optical amplifier 200. Then, the optical amplifier controller 207 sends a DGE control instruction to the DGE 203 to control the insertion loss value of the DGE 203 to be adjusted to G3.

Specifically, G1, G2, G3, and G0 satisfy the following relation expression: $G3=G1+G2-G0$.

In addition, it should be noted that the RFA gain controller 205, the first EDFA gain controller 206, and the optical amplifier controller 207 may be integrated together, or may be separately disposed.

In some embodiments, a connection sequence of the RFA, the EDFA, and the DGE is interchangeable. This is not limited in this application.

In some embodiments, the EDFA may include a doped fiber and a pump source, where the pump source is disposed upstream or downstream of a transmission fiber along an optical signal transmission direction, and there may be one or more pump sources.

In some embodiments, the DGE may be a tunable optical filter of any technology or a dynamically tunable optical filter including a preset filtering function, for example, 1×1 WSS or a cascaded Fiber Bragg Grating (FBG) filter.

The DGE-based hybrid optical amplifier provided in some embodiments of this application resolves the problem of an uneven gain in a dynamic gain adjustment process of a cascade of two types of optical amplifiers such as a Raman fiber amplifier and an erbium-doped fiber amplifier, significantly improves the noise performance of the amplifier, and reduces additional loss caused by the use of a GFF and a VOA in an existing technical solution.

The terms such as "first" and "second" in this application are used to distinguish between similar objects, but are not used for describing a particular sequence or order. It should be understood that the data termed in such a way is interchangeable in proper situations, so that the embodiments described herein can be implemented in an order that is not described in this application. The term "and/or" is used to describe an association relationship between associated objects, and indicates that three relationships may exist. For example, A and/or B may represent the following three cases: Only A exists, both A and B exist, and only B exists. A specific operation method in a method embodiment may also be applied to an apparatus embodiment. In addition, to more clearly reflect a relationship between components in different embodiments, in this application, same reference numerals are used to represent components with a same or similar function in different embodiments.

It should be further noted that, unless otherwise specified, descriptions of some technical features in one embodiment may also be applicable to corresponding technical features mentioned in another embodiment.

Figure 3:
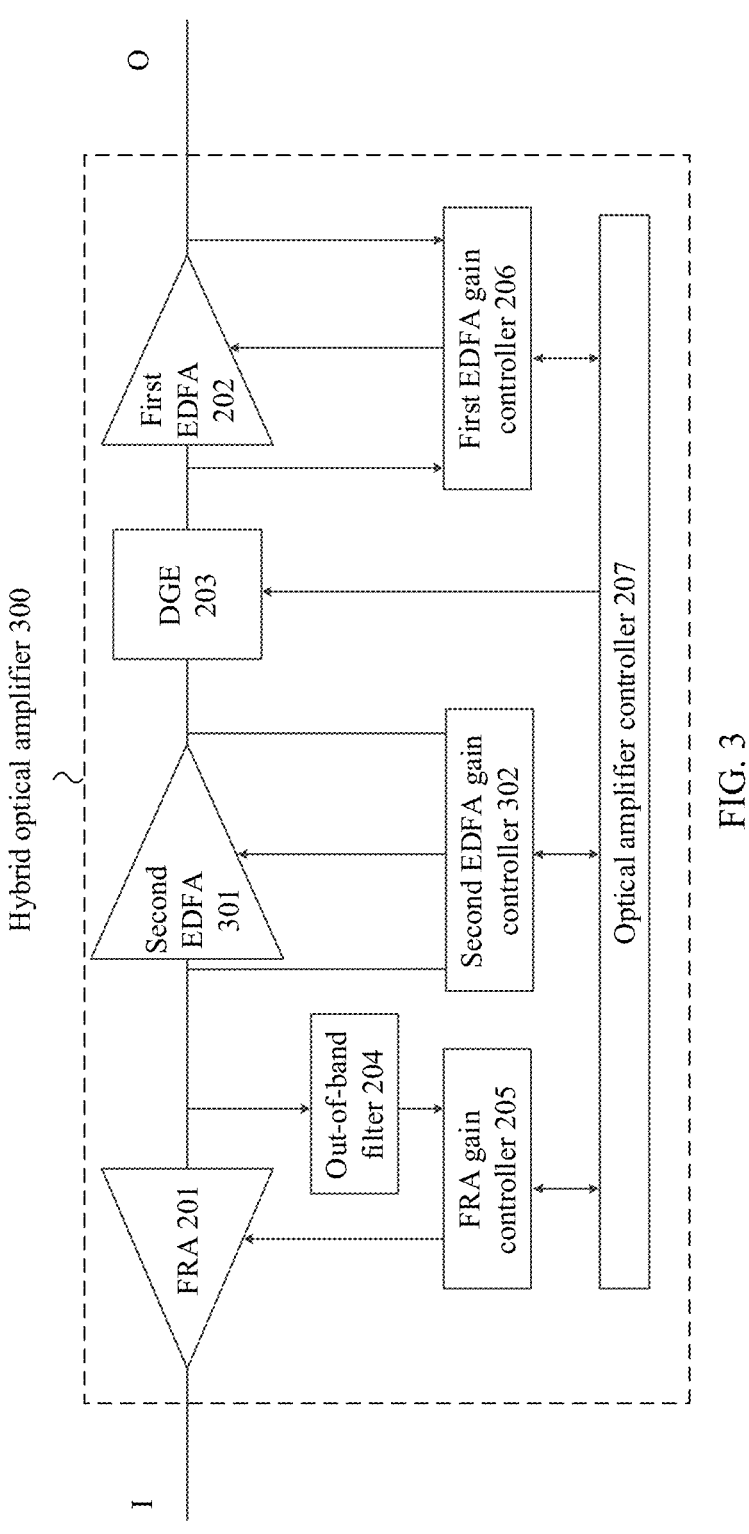
FIG. 3 is a schematic structural diagram of still another hybrid optical amplifier 300 according to an embodiment of this application.

FIG. 3 is a schematic structural diagram of still another hybrid optical amplifier 300 according to an embodiment of this application. As shown in FIG. 3, the hybrid optical amplifier 300 differs from the hybrid optical amplifier 200 in FIG. 2 in that a second EDFA 301 and a second EDFA gain controller 302 are added. A working principle of the second EDFA 301 is similar to that of the first EDFA 202, for which reference may be made to the foregoing description of the first EDFA 202. The second EDFA 301 is connected between the RFA 201 and the DGE 203, or the second EDFA 301 is connected between the DGE 203 and the first EDFA 202. The second EDFA 301 is connected to the second EDFA gain controller 302. The second EDFA gain controller 302 generates a third pump control signal according to a fourth instruction sent by the optical amplifier controller 207, and sends the third pump control signal to the second EDFA 301. The second EDFA adjusts a pump current based on the third pump control signal, and thereby adjusts a gain.

After the optical amplifier controller 207 of the hybrid optical amplifier 300 receives the actual gain value G1 of the RFA 201, the actual gain value G2 of the EDFA 202, and the actual gain value G4 of the EDFA 301, the optical amplifier controller 207 obtains an insertion loss value G3 of the DGE 203 by means of calculation based on the target amplification gain G0 of the hybrid optical amplifier 300, and outputs a corresponding control signal to the DGE 203.

Specifically, G1, G2, G3, G4, and G0 satisfy the following relation expression: $G3=G1+G2+G4-G0$.

The hybrid optical amplifier 300 has a three-stage amplifier structure, which has a wider tunable gain range than that of the two-stage amplifier structure of the hybrid optical amplifier 200 in FIG. 2. Similarly, the hybrid optical amplifier may further include a structure having four stages of amplifiers, five stages of amplifiers, or more stages of amplifiers. A principle thereof is similar to that of the embodiment corresponding to FIG. 3, and details are not described herein again.

Figure 4:
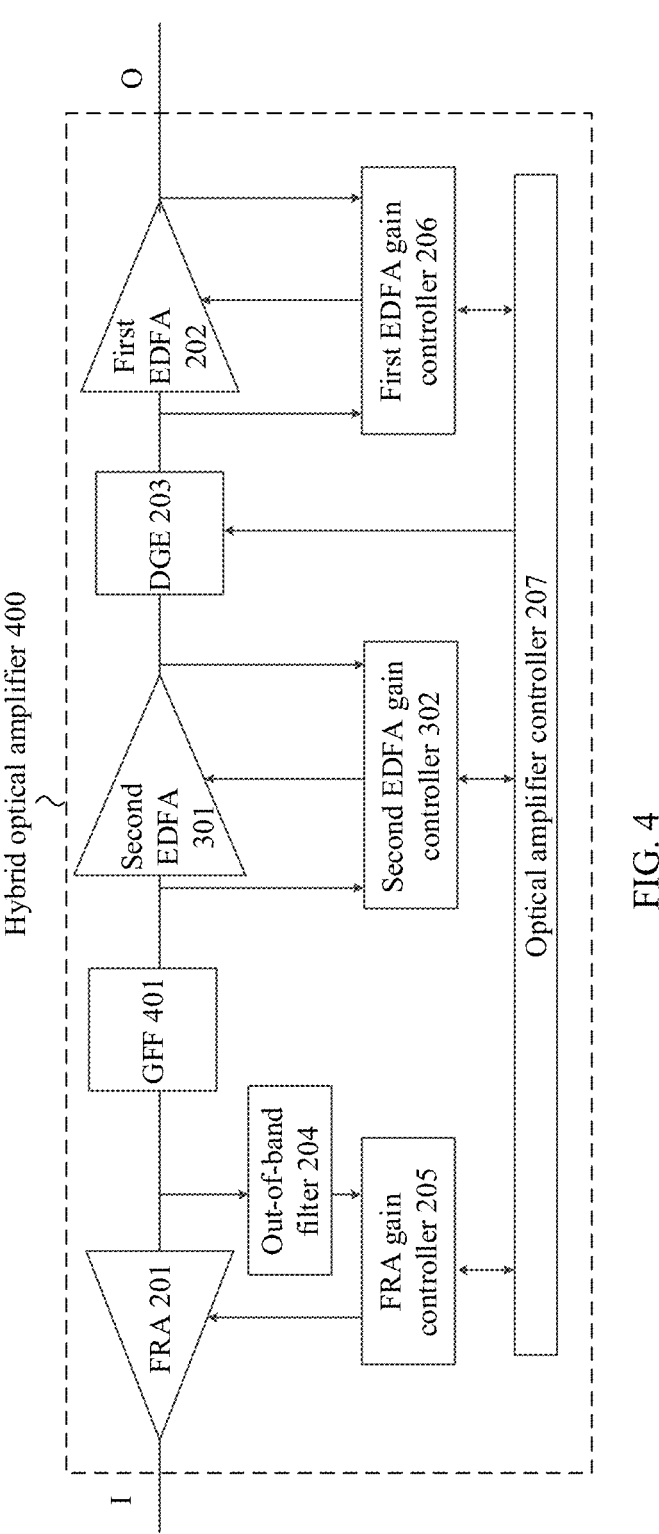
FIG. 4 is a schematic structural diagram of yet another hybrid optical amplifier 400 according to an embodiment of this application.

FIG. 4 is a schematic structural diagram of yet another hybrid optical amplifier 400 according to an embodiment of this application. As shown in FIG. 4, compared with the hybrid optical amplifier 300 in FIG. 3, the hybrid optical amplifier 400 has an addition of a GFF 401 between the RFA 201 and the EDFA 301. After the optical amplifier controller 207 of the hybrid optical amplifier 400 receives the actual gain value G1 of the RFA 201, the actual gain value G2 of the EDFA 202, the actual gain value G4 of the EDFA 301, and a fixed insertion loss value G5 of the GFF 401, the optical amplifier controller 207 obtains an actual insertion loss value G3 of the DGE 203 by means of calculation based on the target amplification gain G0 of the hybrid optical amplifier 400, and sends a corresponding control signal to the DGE 203.

Specifically, G1, G2, G3, G4, G5, and G0 satisfy the following relation expression: $G3=G1+G2+G4-G0-G5$.

Compared with the structure of the hybrid optical amplifier in FIG. 3, the structure of the hybrid optical amplifier 400 has a lower requirement for a dynamically tunable range of insertion loss of a DGE.

It should be particularly noted that, the EDFA in the embodiments of FIG. 2 to FIG. 4 of this application may alternatively be an SOA. In addition, the DGE may alternatively be positioned at the left terminal of the RFA, or between the RFA and the EDFA, or at the right terminal of the EDFA; and the GFF 401 may also be flexibly positioned, and may be positioned at the left terminal of the RFA 201, or at the right terminal of the first EDFA 203, or between the DGE 203 and the first EDFA 202, or the like. This is not limited in this application.

Figure 5:
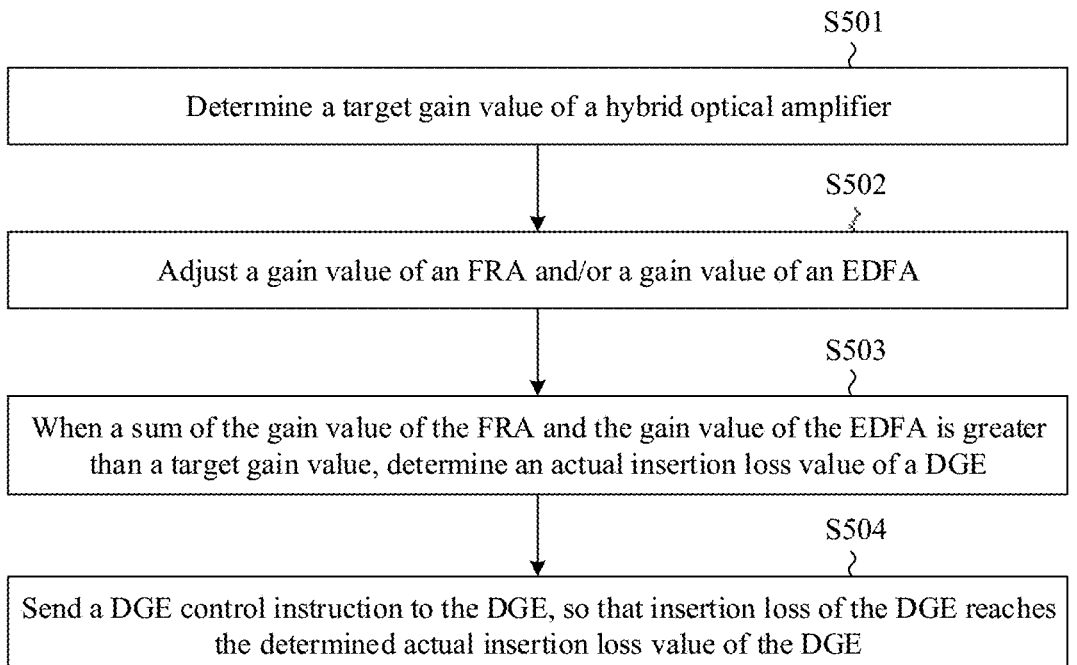
FIG. 5 shows a gain adjustment method for a hybrid optical amplifier according to an embodiment of this application.

FIG. 5 shows a gain adjustment method for a hybrid optical amplifier according to an embodiment of this application. The gain adjustment method is applicable to any hybrid optical amplifier in the foregoing embodiments. As shown in FIG. 5, the gain adjustment method includes the following steps.

S501: Determine a target gain value of a hybrid optical amplifier.

The target gain value G0 of the hybrid optical amplifier is preconfigured.

S502: Adjust a gain value of an RFA and/or an EDFA.

The gain value of the RFA and/or the EDFA in the hybrid optical amplifier is adjusted, and the adjustment procedure may be implemented based on a priority adjustment of the RFA.

(1) In an initial state, a gain of the RFA is set to an initial gain value G1min, and a gain of the EDFA is set to an initial gain value G2min.

(2) The RFA is preferentially adjusted. An optical amplifier controller controls an RFA gain controller to gradually increase pump power of the RFA, and receives, in real time, an actual gain value G1 of the RFA that is fed back by the RFA gain controller, until the optical amplifier controller determines that G1+G2min>G0 at a moment. When the pump power of the RFA reaches a maximum, if the gain value G1max still cannot satisfy G1max+G2min≥G0, the EDFA starts to be adjusted, the pump power of the EDFA is gradually increased, and the optical amplifier controller receives, in real time, an actual gain value G2 of the EDFA that is fed back by an EDFA gain controller, until G1max+G2≥G0 at a moment.

Optionally, in the adjustment process, the sum of the gain of the RFA and the gain of the EDFA of the hybrid optical amplifier keeps unchanged.

For the adjustment, alternatively, the gain value of the EDFA may be preferentially adjusted, or the gain value of the RFA and the gain value of the EDFA are adjusted simultaneously.

S503: When the sum of the gain value of the RFA and the gain value of the EDFA is greater than the target gain value G0, determine an actual insertion loss value of a DGE.

If the optical amplifier controller determines, at a moment, that the sum of the actual gain value G1 of the RFA and the actual gain value G2 of the EDFA is greater than the target gain value G0, the actual insertion loss value G3 of the DGE may be calculated.

Specifically, G3=G1+G2−G0.

S504: Output a DGE control instruction to the DGE, so as to adjust the insertion loss of the DGE to reach the actual insertion loss value of the DGE.

The optical amplifier controller outputs the corresponding DGE control instruction, so as to adjust the insertion loss of the DGE to reach the actual insertion loss value G3 of the DGE.

The gain adjustment method disclosed in this embodiment of this application can improve the Noise Figure (NF) performance of the amplifier running at different gains.

This embodiment of this application further provides an NF calculation formula for a multi-stage hybrid optical amplifier. An NF calculation formula for the two-stage hybrid optical amplifier in the embodiment corresponding to FIG. 2 is:

$$NF0 = NF_{1\_eff} + \frac{L_1 NF_2 - 1}{G_{1\_on\text{-}off}}$$

An NF calculation formula for the three-stage hybrid optical amplifier corresponding to FIG. 3 or FIG. 4 is:

$$NF0 = NF_{1\_eff} + \frac{L_1 NF_2 - 1}{G_{1\_on\text{-}off}} + \frac{L_1 L_2 NF_3 - 1}{G_{1\_on\text{-}off} G_2}$$

NF0 is a noise figure of the hybrid optical amplifier, $NF_{1\_eff}$ is a noise figure of the RFA (the RFA 201), $NF_2$ is a noise figure of the second stage of optical amplifier (the EDFA 301), $NF_3$ is a noise figure of the third stage of optical amplifier (the EDFA 202), $L_1$ is a loss value between the first stage of optical amplifier and the second stage of optical amplifier (between the RFA 201 and the EDFA 301), and $L_2$ is a loss value between the second stage of amplifier and the third stage of amplifier (between the EDFA 301 and the EDFA 202). The NF value of the amplifier can be reduced by reducing the internal loss $L_1$ and $L_2$ of the optical amplifiers. $G_{1\_on\text{-}off}$ is an on-off gain of the RFA, $G_2$ is a net gain (a power ratio of an output signal to an input signal) of the second stage of optical amplifier (the EDFA 301).

According to the foregoing formula, it can be determined that NF0 is most affected by $NF_{1\_eff}$, and therefore the RFA is adjusted preferentially; and NF0 is less affected by $NF_2$, and least affected by $NF_3$. Therefore, adjustment may be performed in the order of the first stage of optical amplifier, the second stage of optical amplifier, and the third stage of optical amplifier, so as to improve noise performance of the hybrid optical amplifier.

The hybrid optical amplifier may further include a structure having four stages of amplifiers, five stages of amplifiers, or more stages of amplifiers. A corresponding NF calculation formula for the hybrid optical amplifier may be deduced by analogy with the foregoing formula, and details are not described herein again.

Figures 6, 7:
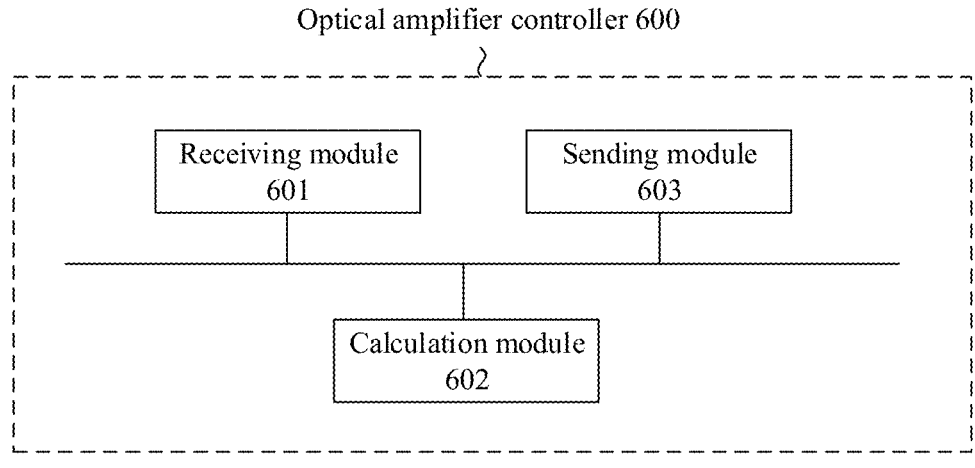
FIG. 6 shows an optical amplifier controller 600 according to an embodiment of this application.
FIG. 7 shows a gain controller 700 according to an embodiment of this application.

FIG. 6 shows an optical amplifier controller 600 according to an embodiment of this application. The optical amplifier controller is applicable to any one of the foregoing hybrid optical amplifiers. As shown in FIG. 6, the optical amplifier controller includes a receiving module 601, a calculation module 602, and a sending module 603.

The sending module 603 is configured to send a control instruction to adjust a pump current of an RFA or an EDFA.

The receiving module 601 is configured to receive a first feedback message and a second feedback message, where the first feedback message includes an actual gain value of the RFA, and the second feedback message includes an actual gain value of the EDFA.

The calculation module 602 is configured to determine an actual insertion loss value of a DGE based on the actual gain value of the RFA and the actual gain value of the EDFA.

The sending module 603 is configured to send a DGE control instruction, so as to adjust a gain of the DGE to reach the determined actual insertion loss value of the DGE.

Specifically, the determining, by the calculation module 602, an actual insertion loss value of a DGE based on the actual gain value of the RFA and the actual gain value of the EDFA includes:

determining, by the calculation module 602, whether a sum of the actual gain value of the RFA and the actual gain value of the EDFA is greater than a target gain value of the optical amplifier:

when the calculation module 602 determines that the sum of the actual gain value of the RFA and the actual gain value of the EDFA is greater than the target gain value of the hybrid optical amplifier, the actual insertion loss value of the DGE is a value obtained by subtracting the target gain value of the optical amplifier from the sum of the actual gain value of the RFA and the actual gain value of the EDFA.

Specifically, the sending, by the sending module 603, a control instruction to adjust a pump current of an RFA or an EDFA includes:

sending, by the sending module 603, a first instruction to an RFA gain controller, and/or sending a second instruction to an EDFA gain controller, where the first instruction is used to generate a first pump control signal to adjust the actual gain value of the RFA; and the second instruction is used to generate a second pump control signal to adjust the actual gain value of the EDFA.

FIG. 7 shows a gain controller 700 according to an embodiment of this application. The gain controller is applicable to any one of the foregoing hybrid optical amplifiers. As shown in FIG. 7, the optical amplifier controller includes a receiving module 701, a calculation module 702, and a sending module 703.

The receiving module 701 is configured to receive a control instruction.

The calculation module 702 is configured to generate a pump control signal according to the control instruction, where the pump control signal is used to adjust a pump current of an RFA and/or an EDFA.

The sending module 703 is configured to send the pump control signal.

Optionally, the sending module 703 is further configured to send a first feedback message to an optical amplifier controller, or send a second feedback message to the optical amplifier controller, where the first feedback message includes an actual gain value of the RFA, and the second feedback message includes an actual gain value of the EDFA.

Figure 8:
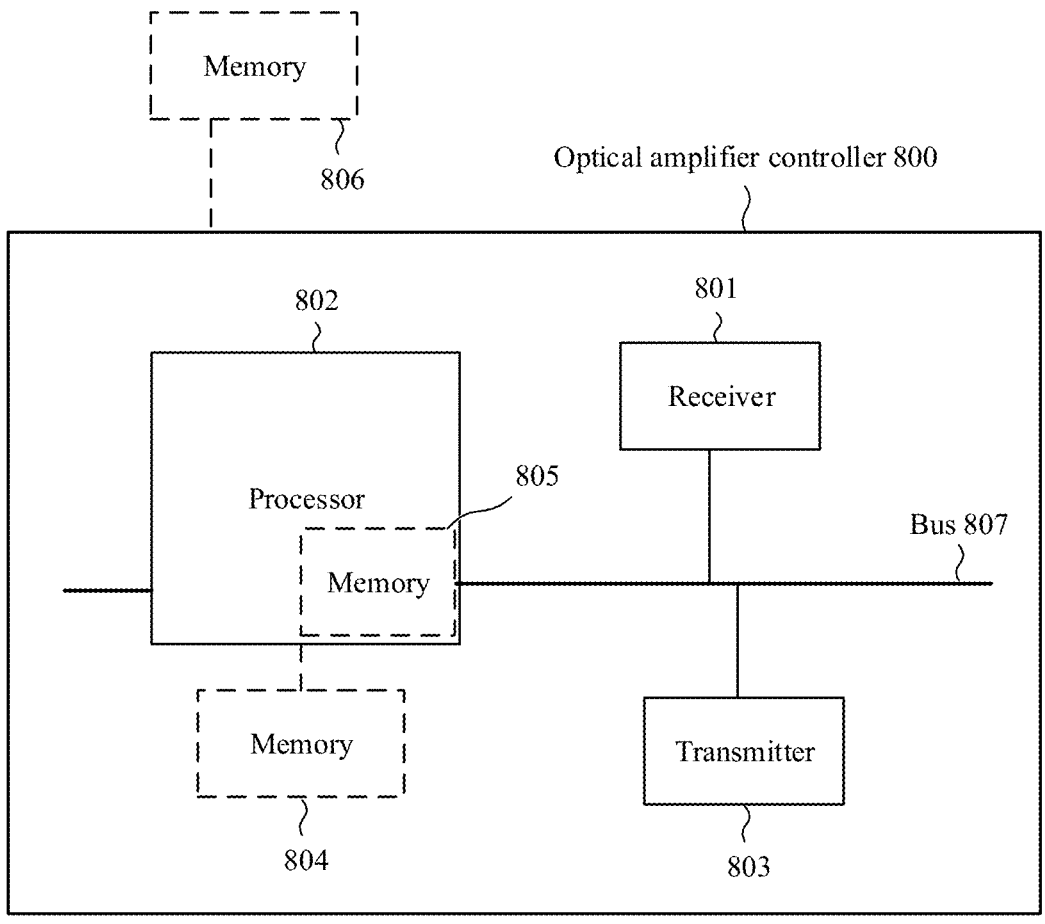
FIG. 8 shows another optical amplifier controller 800 according to an embodiment of this application.

Some functions/components or all functions/components of the optical amplifier controllers or the gain controllers in the foregoing embodiments may be implemented by hardware, or may be implemented by software. FIG. 8 is a schematic structural diagram of another optical amplifier controller 800 according to an embodiment of this application. The optical amplifier controller 800 includes a receiver 801, a processor 802, and a transmitter 803.

The transmitter 803 is configured to send a control instruction to adjust a pump current of an RFA or an EDFA.

The receiver 801 is configured to receive a first feedback message and a second feedback message, where the first feedback message includes an actual gain value of the RFA, and the second feedback message includes an actual gain value of the EDFA.

The processor 802 is configured to execute a program stored in a memory 804, a memory 805, or a memory 806, and when the program is run, determine an actual insertion loss value of a DGE based on the actual gain value of the RFA and the actual gain value of the EDFA.

The transmitter is further configured to send a DGE control instruction, so that the insertion loss of the DGE reaches the determined actual insertion loss value of the DGE.

Alternatively, the memory 804, the memory 805, or the memory 806 may store data generated or used in a process in which the processor performs the gain adjustment method. For example, the memory is a cache. The memory may be a physically independent/separate unit, or may be a storage space, a network hard disk, or the like on a cloud server.

Optionally, the memory 804 is located in the apparatus.

Optionally, the memory 805 is integrated with the processor 802.

Optionally, the memory 806 is located outside the apparatus.

The processor 802 may be a central processing unit (CPU), a network processor (NP), or a combination of a CPU and an NP.

Alternatively, the processor 802 may be a hardware chip, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory in this embodiment of this application may include a volatile memory, for example, a random access memory (RAM). The memory may alternatively include a non-volatile memory, for example, a flash memory, a hard disk drive (HDD), a solid-state drive (SSD), a cloud storage, a network attached storage (NAS), or a network drive. The memory may alternatively include a combination of the foregoing types of memories or another medium or product, in any form, that has a storage function.

Optionally, the apparatus is a chip or an integrated circuit.

The bus 807 may be classified into an address bus, a data bus, a control bus, and the like. For ease of representation, only one thick line is used to represent the bus in FIG. 8, but this one line may represent one or more buses or one or more types of bus.

The receiver and the transmitter in this embodiment of this application may be integrated and combined into a transceiver.

Figure 9:
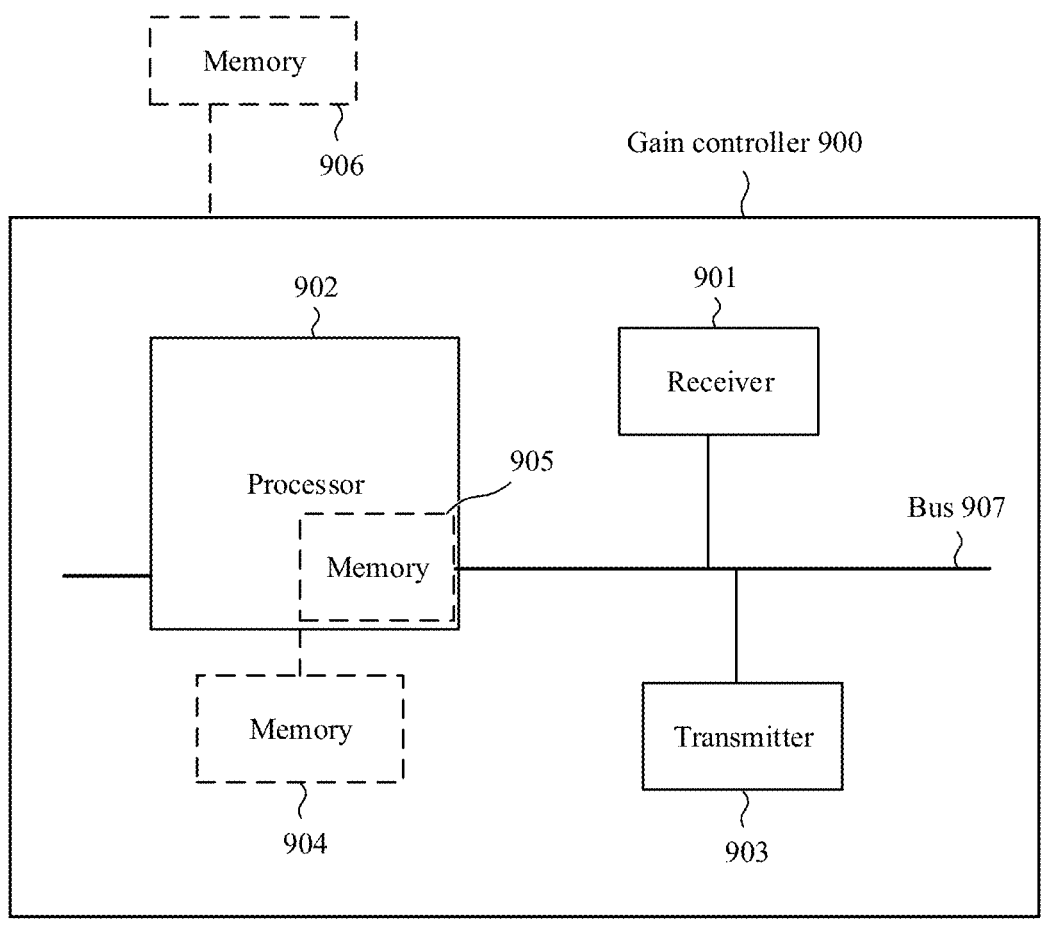
FIG. 9 shows another gain controller 900 according to an embodiment of this application.

FIG. 9 shows another gain controller 900 according to an embodiment of this application, and the gain controller 900 includes a receiver 901, a processor 902, and a transmitter 903.

The receiver 901 is configured to receive a control instruction.

The processor 902 is configured to execute a program stored in a memory 804, a memory 805, or a memory 806, and when the program is run, generate a pump control signal according to the received control instruction, where the pump control signal is used to adjust a pump current of an RFA and/or an EDFA.

The transmitter 903 is configured to send the pump control signal. For related descriptions of the processor, the memory, the receiver, and the transmitter in this embodiment, refer to the embodiment corresponding to FIG. 7. Details are not described herein again.

Figure 10:
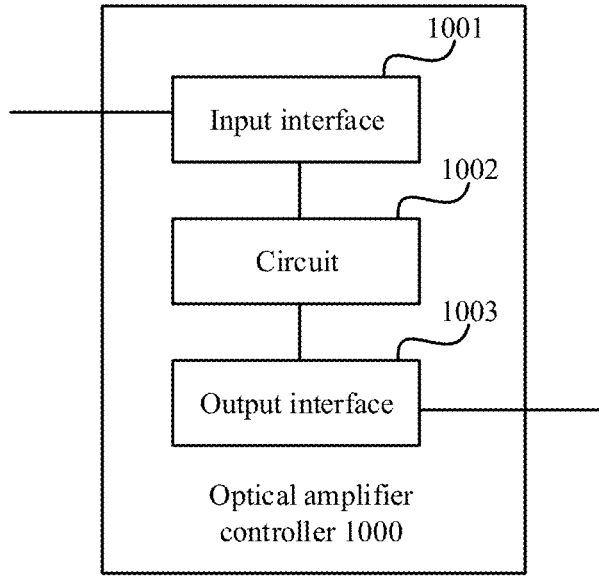
FIG. 10 shows another optical amplifier controller 1000 according to an embodiment of this application.

Some or all of the optical amplifier controllers or the gain controllers described in the foregoing embodiments may be implemented by hardware. FIG. 10 is a schematic structural diagram of still another optical amplifier controller 1000 according to an embodiment of this application. The optical amplifier controller 1000 includes an input interface 1001, a circuit 1002, and an output interface 1003.

The output interface 1003 is configured to output a control instruction to adjust a pump current of an RFA or an EDFA.

The input interface 1001 is configured to obtain a first feedback message and a second feedback message, where the first feedback message includes an actual gain value of the RFA, and the second feedback message includes an actual gain value of the EDFA.

The circuit 1002 is configured to determine an actual insertion loss value of a DGE based on the actual gain value of the RFA and the actual gain value of the EDFA.

The output interface 1003 is further configured to output a DGE control instruction, so that insertion loss of the DGE reaches the determined actual insertion loss value of the DGE.

Figure 11:
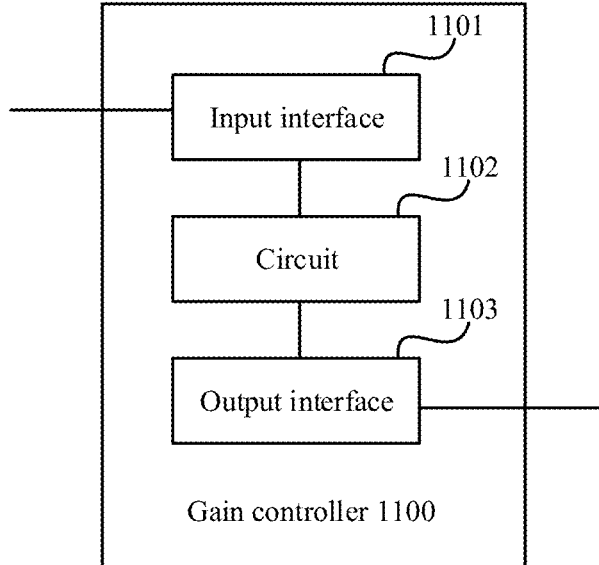
FIG. 11 shows another gain controller 1100 according to an embodiment of this application.

FIG. 11 is a schematic structural diagram of still another gain controller 1100 according to an embodiment of this application. The gain controller 1100 includes an input interface 1101, a circuit 1102, and an output interface 1103. The input interface 1101 is configured to obtain a control instruction.

The circuit 1102 is configured to generate a pump control signal according to the control instruction, where the pump control signal is used to adjust a pump current of an RFA and/or an EDFA.

The output interface 1103 is configured to output the pump control signal.

Optionally, the output interface 1103 is further configured to output a first feedback message to an optical amplifier controller, or output a second feedback message to the optical amplifier controller, where the first feedback message includes an actual gain value of the RFA, and the second feedback message includes an actual gain value of the EDFA.

The optical amplifier controller and the gain controller in this embodiment of this application may be physically independent units, or may be integrated together.

For same and similar parts in the embodiments of this application, reference may be made to each other. In particular, the embodiments of FIG. 6 to FIG. 11 are described briefly because these embodiments are based on the embodiments corresponding to FIG. 1 to FIG. 5. For related parts, refer to description of the parts of the embodiments corresponding to FIG. 1 to FIG. 5.

This application provides a chip. The chip may include a memory and a processor. The memory is configured to store a computer program, and the processor is configured to invoke the computer program from the memory and run the computer program, to perform the method performed in the foregoing embodiments of FIG. 8 and FIG. 9.

Optionally, the chip includes the processor. The processor is configured to read and execute the computer program stored in the memory. When the computer program is executed, the processor performs the method performed in the foregoing embodiments of FIG. 8 and FIG. 9.

Optionally, the memory and the processor may be physically independent or separate units, or the memory and the processor may be integrated together.

An embodiment of this application further provides a system chip. The system chip includes a processing unit and a communications unit. The processing unit may be, for example, a processing circuit. The communications unit may be, for example, an input/output interface, a pin, or a circuit. The processing unit may perform the method performed by the circuit in FIG. 10 or FIG. 11, and the communications unit performs the method performed by the input interface or the output interface in the embodiment in FIG. 10 or FIG. 11.

Figure 12:
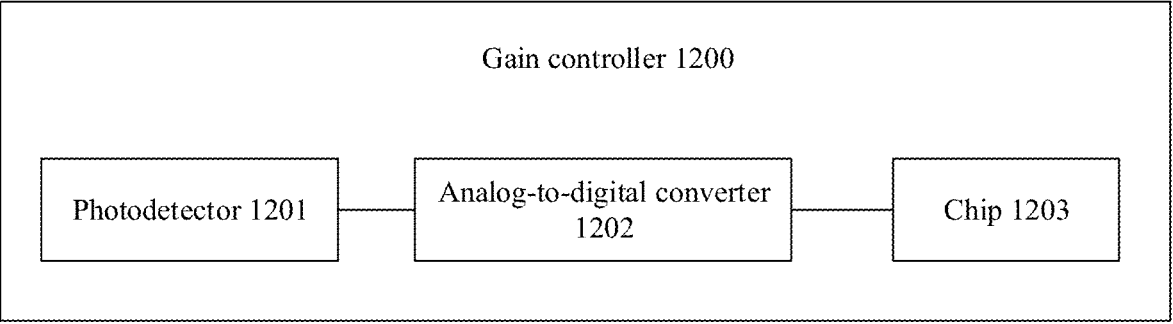
FIG. 12 shows a gain controller 1200 according to an embodiment of this application.

An embodiment of this application further provides a gain controller 1200. As shown in FIG. 12, the gain controller 1200 includes a Photodetector (PD) 1201, an analog-to-digital converter 1202, and a chip 1203. The PD 1201 is configured to detect an input optical power gain of an optical amplifier, convert an optical signal into an electrical signal, and output the electrical signal to the analog-to-digital converter 1202 via an interface. The chip 1203 is connected to the analog-to-digital converter 1202 via the interface to read the input optical power gain. The chip 1203 may be the system chip in the foregoing embodiments and performs the method performed by the system chip, where the method includes outputting an obtained optical power gain value to an optical amplifier controller via an output interface.

An embodiment of this application provides a computer-readable storage medium, including computer readable instructions. When a computer reads and executes the computer readable instructions, the computer is enabled to perform the method performed by the processor.

An embodiment of this application further provides a computer program product including instructions. When the computer program product runs on a computer, the computer is enabled to perform the method performed by the processor.

Obviously, a person skilled in the art should understand that the foregoing modules or steps in the present invention may be implemented by using a general-purpose computing apparatus, and the modules or steps may be centralized on a single computing apparatus, or distributed on a network including a plurality of computing apparatuses. Optionally, the modules or steps may be implemented by using program code that can be executed by the computing apparatus, so that the modules or steps may be stored in a storage medium (ROM/RAM, magnetic disk, or optical disc) and executed by the computing apparatus. In addition, in some cases, the steps shown or described may be performed in a sequence different from that described herein. Alternatively, the modules or steps are fabricated into various integrated circuit modules, or into a single integrated circuit module for implementation. In this way, a combination of any specific hardware and software is not limited in the present invention.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An optical amplifier, comprising a Raman fiber amplifier (RFA), a dynamic gain equalizer (DGE), a filter, a first erbium-doped fiber amplifier (EDFA), an RFA gain controller, a first EDFA gain controller, and an optical amplifier controller, wherein the RFA gain controller is connected to the RFA, the RFA gain controller is further connected to the filter, and the filter is connected to an output terminal of the RFA; the first EDFA gain controller is connected to the first EDFA; the optical amplifier controller is connected to the RFA gain controller, and the optical amplifier controller is further connected to the first EDFA gain controller; and the RFA is connected to the DGE, and the DGE is further connected to the first EDFA;

the optical amplifier controller is configured to send a first instruction to the RFA gain controller, send a second instruction to the first EDFA gain controller, and send a DGE control instruction to the DGE; the RFA and the first EDFA are configured to amplify an optical signal, and the RFA gain controller is configured to control the RFA to adjust a gain according to the first instruction; the first EDFA gain controller is configured to control the first EDFA to adjust a gain according to the second instruction; and the DGE adjusts an insertion loss according to the DGE control instruction; and the filter is configured to filter an amplified spontaneous emission (ASE) signal produced in an optical amplification process of the RFA;

wherein the optical amplifier controller determines an on-off gain of the RFA based on the ASE signal, wherein the on-off gain is a ratio of an output signal power with a pump of the RFA turned on to an output signal power with the pump turned off.

2. The optical amplifier according to claim 1, wherein the RFA gain controller being configured to control the RFA to adjust a gain according to the first instruction sent by the optical amplifier controller comprises:

receiving, by the RFA gain controller, the first instruction sent by the optical amplifier controller; and sending, by the RFA gain controller, a first pump control signal to the RFA according to the first instruction, so that the RFA adjusts a pump current based on the first pump control signal.

3. The optical amplifier according to claim 1, wherein the first EDFA gain controller being configured to control the first EDFA to adjust a gain according to the second instruction sent by the optical amplifier controller comprises:

receiving, by the first EDFA gain controller, the second instruction sent by the optical amplifier controller; and sending, by the first EDFA gain controller, a second pump control signal to the first EDFA according to the second instruction, so that the first EDFA adjusts a pump current based on the second pump control signal.

4. The optical amplifier according to claim 1, wherein the optical amplifier further comprises a second EDFA and a second EDFA gain controller, wherein the second EDFA is connected between the RFA and the DGE, or the second EDFA is connected between the DGE and the first EDFA; and the second EDFA is connected to the second EDFA gain controller, and the second EDFA gain controller controls the second EDFA to adjust a gain, according to a fourth instruction sent by the optical amplifier controller.

5. The optical amplifier according to claim 4, wherein the second EDFA gain controller being configured to control the second EDFA to adjust a gain, according to a fourth instruction sent by the optical amplifier controller comprises:

receiving, by the second EDFA gain controller, the fourth instruction sent by the optical amplifier controller; and sending, by the second EDFA gain controller, a third pump control signal to the second EDFA according to the fourth instruction, so that the second EDFA adjusts a pump current based on the third pump control signal.

6. The optical amplifier according to claim 1, wherein the optical amplifier further comprises a gain flattening filter (GFF), and the GFF is configured to narrow an adjustment range of the insertion loss of the DGE.

7. The optical amplifier according to claim 1, wherein the RFA gain controller is further configured to send a first feedback message to the optical amplifier controller, and the first feedback message comprises an actual gain value of the RFA; the first EDFA gain controller is further configured to send a second feedback message to the optical amplifier controller, and the second feedback message comprises an actual gain value of the first EDFA.

8. The optical amplifier according to claim 7, wherein the optical amplifier controller obtains an insertion loss value of the DGE based on the actual gain value of the RFA and the actual gain value of the first EDFA, and the insertion loss value of the DGE is a value obtained by subtracting a target gain value of the optical amplifier from a sum of the actual gain value of the RFA and the actual gain value of the first EDFA.

9. A gain adjustment method for an optical amplifier, wherein the method is applied to the optical amplifier according to claim 1, and the method comprises:

determining a target gain value of the optical amplifier;

adjusting an actual gain value of an RFA or an EDFA, and when a sum of the actual gain value of the RFA and the actual gain value of the EDFA is greater than the target gain value of the optical amplifier, determining an actual insertion loss value of the DGE; and sending a DGE control instruction to the DGE to adjust the insertion loss so that the insertion loss of the DGE reaches the determined actual insertion loss value of the DGE.

10. The gain adjustment method according to claim 9, wherein the actual insertion loss value of the DGE is obtained by subtracting the target gain value of the optical amplifier from a sum of the actual gain value of the RFA and the actual gain value of the EDFA.

11. The gain adjustment method according to claim 9, wherein the adjusting an actual gain value of an RFA or an EDFA comprises:

sending, by the optical amplifier controller, a first instruction to the RFA gain controller, or sending a second instruction to the EDFA gain controller;

generating, according to the first instruction, a first pump control signal to adjust the actual gain value of the RFA; or generating, according to the second instruction, a second pump control signal to adjust the actual gain value of the EDFA.

12. A memory configured to store a computer-executable instruction that, when executed by a processor, causes the processor to perform:

sending a first or a second control instruction to adjust a pump current of a RFA or a EDFA respectively;

receiving a first feedback message and a second feedback message, wherein the first feedback message comprises an actual gain value of the RFA, and the second feedback message comprises an actual gain value of the EDFA;

determining an actual insertion loss value of a DGE based on the actual gain value of the RFA and the actual gain value of the EDFA; and sending a DGE control instruction to control the insertion loss of the DGE, so that insertion loss of the DGE reaches the determined actual insertion loss value of the DGE;

wherein the determining an actual insertion loss value of a DGE based on the actual gain value of the RFA and the actual gain value of the EDFA comprises:

determining that the sum of the actual gain value of the RFA and the actual gain value of the EDFA is greater than the target gain value of the optical amplifier;

subtracting the target gain value of the optical amplifier from the sum of the actual gain value of the RFA and the actual gain value of the EDFA to obtain the actual insertion loss value of the DGE.

13. The memory according to claim 12, wherein the sending a first or second control instruction to adjust a pump current of an RFA or an EDFA comprises:

sending the first instruction to the RFA gain controller, or
sending the second instruction to the EDFA gain con-
troller, wherein
the first instruction is used to generate a first pump control
signal to adjust the actual gain value of the RFA; and
the second instruction is used to generate a second pump
control signal to adjust the actual gain value of the
EDFA.

* * * * *